US012523558B2

(12) United States Patent
Hidaka et al.

(10) Patent No.: US 12,523,558 B2
(45) Date of Patent: Jan. 13, 2026

(54) PRESSURE SENSOR THAT MITIGATES ZERO DROP PHENOMENA (71) Applicants: FUJIKIN INCORPORATED, Osaka (JP); NIDEC COPAL ELECTRONICS CORPORATION, Tokyo (JP)

(72) Inventors: Atsushi Hidaka, Osaka (JP); Takatoshi Nakatani, Osaka (JP); Kaoru Hirata, Osaka (JP); Kouji Nishino, Osaka (JP); Nobukazu Ikeda, Osaka (JP); Masaki Fukasawa, Sano (JP)

(73) Assignees: FUJIKIN INCORPORATED, Osaka (JP); NIDEC COPAL ELECTRONICS CORPORATION, Tokyo (JP)

( * ) Notice: Subject to any disclaimer, the term of this patent is extended or adjusted under 35 U.S.C. 154(b) by 296 days.

(21) Appl. No.: 18/254,235

(22) PCT Filed: Nov. 2, 2021

(86) PCT No.: PCT/JP2021/040333
§ 371 (c)(1),
(2) Date: May 24, 2023

(87) PCT Pub. No.: WO2022/137812
PCT Pub. Date: Jun. 30, 2022

(65) Prior Publication Data
US 2024/0094078 A1 Mar. 21, 2024

(30) Foreign Application Priority Data

Dec. 23, 2020 (JP) ................................. 2020-213900

(51) Int. Cl.
*G01L 9/00* (2006.01)
*G01L 19/00* (2006.01)

(52) U.S. Cl.
CPC ........ *G01L 9/0044* (2013.01); *G01L 19/0007* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 6,076,409 A * 6/2000 Bang .................... G01L 19/0038
73/756
6,302,130 B1 10/2001 Ohmi et al.
(Continued)

FOREIGN PATENT DOCUMENTS

CN 105074408 A 11/2015
DE 102016210682 A1 * 12/2017 ........... G01L 19/003
(Continued)

OTHER PUBLICATIONS

International Search Report issued in PCT/JP2021/040333; mailed Nov. 30, 2021.
"Heat Treatment Technology Illustration Handbook", edited by Ma Bolong and Yang Man, Jun. 30, 2015, Beijing Machinery Industry Press, pp. 427-438, ISBN: 978-7-111-49328-0; with English concise explanation of relevance.

*Primary Examiner* — Andre J Allen
(74) *Attorney, Agent, or Firm* — Studebaker Brackett PLLC (57) ABSTRACT The pressure sensor 10 comprises: a bottomed cylindrical sensor module 11 having inside a pressure receiving chamber C1 communicating with a flow path and including a diaphragm 11a in contact with the pressure receiving chamber; a pressure detecting element 12 for outputting a strain of the diaphragm 11a as a pressure; a base ring 14 fixed at an outer edge of an open-side end part 11c of the sensor module and disposed on an outer peripheral side of the sensor module 11; a hermetic member 13 fixed to the base ring 14 for forming a sealed vacuum chamber C2 opposite (Continued)

to the pressure receiving chamber C1 across the diaphragm 11a; a gasket 18 sandwiched between the base ring 14 and a body 5; and a pressing flange 19 for pressing the base ring 14 to the body 5 through the gasket 18.

14 Claims, 8 Drawing Sheets

(58) Field of Classification Search
CPC ............. G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 9/0005; G01L 9/0041; G01L 19/0061; G01L 9/0019; G01L 9/08; G01L 9/10; G01L 21/00; G01L 11/006; G01L 9/04; G01L 19/086; G01L 9/0008; G01L 1/18; G01L 9/00; G01L 11/004; G01L 19/069; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; G01L 2924/00014; G01L 2224/48091; G01L 2924/00; G01L 2224/73265; G01L 2224/48247; G01L 2224/48137; G01L 2924/00012; G01L 2924/181; G01L 2224/45144; G01L 2924/10253; G01L 2224/48227; G01L 2224/8592; G01L 2224/49171; G01L 2924/0002; G01L 2224/48465; G01L 2924/1815; G01L 2924/3025; G01L 2924/1461; G01L
2224/32225; G01L 2924/15151; G01L
2924/01079; G01L 2224/48472; G01L
24/48; G01L 2224/05554; G01L 24/45;
G01L 2924/14; G01L 2224/45124; G01L
2924/16152; G01L 21/67253; G01L
2924/01013; G01L 2224/49175; G01L
2924/01006; G01L 2924/16151; G01L
2924/01033; G01L 2924/01078; G01L
2924/01082; G01L 2924/01322; G01L
2224/32245; G01L 2924/10155; G01L
2224/16225; G01L 2924/01005; G01L
2924/13091; G01L 2224/45099; G01L
24/32; G01L 2924/014; G01L
2924/16195; G01L 2224/48464; G01L
24/49; G01L 2924/1305; G01L
2924/3011; G01L 2224/05553; G01L
23/057; G01L 2924/15153; G01L
2924/19107; G01L 2224/05644; G01L
2924/01014; G01L 2924/01047; G01L
2924/09701; G01L 24/05; G01L 24/73;
G01L 2924/01046; G01L 2924/10158;
G01L 2924/1433; G01L 2924/15311;
G01L 2924/01023; G01L 2924/01029;
G01L 2924/01074; G01L 2924/15165;
G01L 2924/19105; G01L 2224/02166;
G01L 2224/04042; G01L 2224/05599;
G01L 2224/73257; G01L 23/49575;
G01L 24/24; G01L 24/80; G01L 24/82;
G01L 25/16; G01L 2924/30105; G01L
2924/351; G01L 21/2007; G01L 21/6835;
G01L 2224/04105; G01L 2224/05568;
G01L 2224/05573; G01L 2224/16227;
G01L 2224/24137; G01L 2224/48699;
G01L 2224/48744; G01L 2224/73204;
G01L 24/19; G01L 2924/01024; G01L
2924/01027; G01L 2924/12042; G01L
2924/15156; G01L 2924/15747; G01L
2924/15787; G01L 2924/19042; G01L
21/568; G01L 22/12; G01L 2224/05001;
G01L 2224/45015; G01L 2224/81801;
G01L 2224/8385; G01L 23/5389; G01L
24/83; G01L 2924/01004; G01L
2924/07811; G01L 2924/207; G01L
21/30608; G01L 21/3065; G01L
21/31111; G01L 21/76897; G01L 22/34;
G01L 2224/05124; G01L 2224/16235;
G01L 2224/16245; G01L 2224/32145;
G01L 2224/45147; G01L 2224/45169;
G01L 2224/48644; G01L 2224/81805;
G01L 2224/83805; G01L 23/291; G01L
23/3121; G01L 23/49503; G01L 24/06;
G01L 24/85; G01L 25/0652; G01L
2924/01015; G01L 2924/01028; G01L
2924/01039; G01L 2924/0105; G01L
2924/01057; G01L 2924/01058; G01L
2924/0106; G01L 2924/01068; G01L
2924/01072; G01L 2924/01073; G01L
2924/12032; G01L 2924/12044; G01L
2924/15192; G01L 2924/19041; G01L
21/67132; G01L 2224/05624; G01L
2224/05647; G01L 2224/08245; G01L
2224/12105; G01L 2224/13; G01L
2224/2612; G01L 2224/26175; G01L
2224/48145; G01L 2224/48147; G01L
2224/48195; G01L 2224/80805; G01L
2224/80893; G01L 2224/80894; G01L
2224/83385; G01L 2224/8389; G01L
2224/92247; G01L 23/053; G01L
23/49811; G01L 23/49877; G01L 23/66;
G01L 24/03; G01L 24/08; G01L 24/18;
G01L 24/96; G01L 25/167; G01L
2924/00015; G01L 2924/01012; G01L
2924/01067; G01L 2924/01077; G01L
2924/16235; G01L 2924/18162; G01L
21/02126; G01L 21/02203; G01L
21/02216; G01L 21/02274; G01L
21/0273; G01L 21/0334; G01L 21/3105;
G01L 21/311; G01L 21/32053; G01L
21/324; G01L 21/4842; G01L 21/561;
G01L 21/67017; G01L 21/67069; G01L
21/67201; G01L 21/67276; G01L
21/6838; G01L 21/76; G01L 21/76297;
G01L 21/764; G01L 21/7682; G01L
21/78; G01L 22/10; G01L 22/32; G01L
2221/00; G01L 2221/68359; G01L
2221/68363; G01L 2224/023; G01L
2224/02379; G01L 2224/05073; G01L
2224/05155; G01L 2224/05166; G01L
2224/05558; G01L 2224/0558; G01L
2224/056; G01L 2224/05669; G01L
2224/16145; G01L 2224/24011; G01L
2224/24051; G01L 2224/24226; G01L
2224/24227; G01L 2224/24998; G01L
2224/2518; G01L 2224/29099; G01L
2224/45014; G01L 2224/451; G01L
2224/4813; G01L 2224/48225; G01L
2224/48257; G01L 2224/48455; G01L
2224/48463; G01L 2224/48475; G01L
2224/48599; G01L 2224/48624; G01L
2224/48647; G01L 2224/48724; G01L
2224/48747; G01L 2224/48799; G01L
2224/48844; G01L 2224/49; G01L
2224/49052; G01L 2224/49109; G01L
2224/49113; G01L 2224/49173; G01L
2224/72; G01L 2224/73267; G01L
2224/76155; G01L 2224/78313; G01L
2224/78318; G01L 2224/82007; G01L
2224/82102; G01L 2224/82103; G01L
2224/8319; G01L 2224/85051; G01L
2224/85148; G01L 2224/85203; G01L
2224/85206; G01L 2224/85444; G01L
2224/85909; G01L 23/051; G01L 23/08;
G01L 23/10; G01L 23/15; G01L 23/29;
G01L 23/293; G01L 23/315; G01L
23/467; G01L 23/4821; G01L 23/4951;
G01L 23/49513; G01L 23/49541; G01L
23/49548; G01L 23/49805; G01L 23/562;
G01L 23/576; G01L 24/10; G01L 24/26;
G01L 24/76; G01L 24/78; G01L 24/81;
G01L 25/03; G01L 25/041; G01L 25/50;
G01L 2924/0001; G01L 2924/00013;
G01L 2924/01007; G01L 2924/0101;
G01L 2924/01019; G01L 2924/01026;
G01L 2924/01038; G01L 2924/0104;
G01L 2924/01041; G01L 2924/01042;
G01L 2924/01051; G01L 2924/01076;
G01L 2924/0133; G01L 2924/04642;
G01L 2924/04941; G01L 2924/05042;
G01L 2924/07802; G01L 2924/10161;

G01L 2924/12036; G01L 2924/1301;
G01L 2924/13062; G01L 2924/15174;
G01L 2924/1531; G01L 2924/15788;
G01L 2924/163; G01L 2924/19043;
G01L 2924/206; G01L 2924/30107;
G01L 21/02107; G01L 21/02282; G01L
21/314; G01L 21/56; G01L 21/67; G01L
21/67051; G01L 22/00; G01L 2224/0603;
G01L 2224/131; G01L 2224/16; G01L
2224/18; G01L 2224/2919; G01L
2224/29191; G01L 2224/48106; G01L
2224/4847; G01L 2224/49105; G01L
2224/82951; G01L 2224/85399; G01L
2225/1023; G01L 2225/1058; G01L
23/047; G01L 23/3128; G01L 23/481;
G01L 23/4952; G01L 23/49558; G01L
23/49861; G01L 23/5226; G01L 23/552;
G01L 23/564; G01L 23/62; G01L 24/09;
G01L 24/13; G01L 24/16; G01L 24/29;
G01L 25/105; G01L 25/165; G01L
2924/0665; G01L 2924/10329; G01L
2924/152; G01L 2924/15331; G01L
2924/1627

USPC .................................................. 73/700–756
See application file for complete search history.

(56)  References Cited

U.S. PATENT DOCUMENTS

| 6,453,747 | B1 * | 9/2002 | Weise | G01L 19/0038 |
| | | | | 73/717 |
| 11,768,123 | B2 * | 9/2023 | Hidaka | G01L 19/142 |
| | | | | 73/723 |
| 2001/0035052 | A1 | 11/2001 | Ohmi et al. | |
| 2016/0053925 | A1 | 2/2016 | Dohi et al. | |
| 2020/0149162 | A1 | 5/2020 | Hidaka et al. | |
| 2021/0356346 | A1 | 11/2021 | Hidaka et al. | |
| 2023/0296464 | A1 * | 9/2023 | Hidaka | G01L 19/147 |
| | | | | 73/756 |

FOREIGN PATENT DOCUMENTS

| JP | 3494594 | B2 | | 2/2004 | |
| JP | 3546153 | B2 | | 7/2004 | |
| JP | 2013-057512 | A | | 3/2013 | |
| JP | 5926858 | B2 * | 5/2016 | ............. F16L 21/03 |
| WO | 2019/021948 | A1 | | 1/2019 | |
| WO | 2020/075600 | A1 | | 4/2020 | |

* cited by examiner

NON Co-Ni ALLOY

| COMPOSITION (Wt.%) | Fe | Cr | Ni | Co | Mo | Al | Ti | W | Si |
|---|---|---|---|---|---|---|---|---|---|
| HASTELLOY | 3.0 | 22 | 56 | ≦2.5 | 13 | — | — | 3.0 | ≦0.08 |
| INCONEL 600 | 6~10 | 14~17 | ≧72 | ≦1 | — | — | — | — | ≦0.8 |
| MAT21 | ≦1 | 19 | Bal | ≦1 | 19 | — | — | — | ≦0.08 |

Co-Ni ALLOY

| COMPOSITION(Wt.%) | Fe | Cr | Ni | Co | Mo | Ti | Nb | Si | Mn | C | P |
|---|---|---|---|---|---|---|---|---|---|---|---|
| SPRON510 | 1.1~2.1 | 19.5~20.5 | 31.4~33.4 | Bal. (35) | 9.5~10.5 | 0.3~0.7 | 0.8~1.2 | ≦0.1 | ≦0.5 | ≦0.03 | ≦0.02 |

Fig.8

(SEALING PRESSURE: 200kPa abs. TEMPERATURE: 210 °C)

| SAMPLE | ITEM | | | | ZERO POINT DROP (kPa) | | | IMPROVEMENT (%) (20 min) |
|---|---|---|---|---|---|---|---|---|
| | MATERIAL | HEAT TREAT | GROOVE | TIGHTENING | 2 min | 20 min | 120 min | |
| S0 | HASTELLOY (C22) | — | — | STRONG | -0.24 | -0.56 | -0.99 | - |
| S1 | HASTELLOY (C22) | — | ○ | STRONG | -0.15 | -0.49 | -0.87 | 12.1 |
| S2 | SPRON510 | — | ○ | STRONG | -0.14 | -0.41 | -0.71 | 28.3 |
| S3 | SPRON510 | ○ | ○ | STRONG | -0.17 | -0.29 | -0.58 | 41.4 |
| S4 | SPRON510 | ○ | ○ | WEAK | -0.08 | -0.28 | -0.47 | 52.5 |

PRESSURE SENSOR THAT MITIGATES ZERO DROP PHENOMENA

TECHNICAL FIELD

The present invention relates to a pressure sensor, in particular, to a diaphragm type pressure sensor suitably used for pressure measurement of gas supplied to a semiconductor manufacturing apparatus or the like.

BACKGROUND ART

In a semiconductor manufacturing facility, a chemical plant, or the like, various kinds of gases such as a raw material gas or an etching gas is supplied to a process chamber. As a device for controlling a flow rate of a supplied gas, a mass flow controller (thermal mass flow controller) or a pressure type flow rate control device is known.

The pressure type flow rate control device is capable of controlling the mass flow rate of various fluids with high accuracy by a relatively simple configuration of combining a control valve and a restriction part (for example, an orifice plate or a critical nozzle) provided downstream thereof. The pressure type flow rate control device has an excellent flow rate control characteristic that the flow rate control can be performed stably even if a primary side supply pressure greatly fluctuates (e.g., Patent Literature 1).

In the pressure type flow rate control device, a pressure sensor is provided for measuring the pressure downstream of the control valve. As such a pressure sensor, a type that detects a pressure of a gas by attaching a strain gauge to a diaphragm has been used (e.g., Patent Literature 2). In such a diaphragm type pressure sensor, the diaphragm is configured to deform or distort in response to the pressure of the measurement gas, and the pressure of the gas is measured based on a magnitude of stress detected by the strain gauge.

Further, in recent years, a configuration for supplying gas by vaporizing a liquid raw material using a vaporization supply device connected to the upstream side of the pressure type flow rate control device is known (e.g., Patent Literature 3). In the vaporization supply device, a liquid raw material such as a trimethylaluminum (TMAl), a tetraethyl orthosilicate (TEOS), or a hexachlorodisilane (HCDS) is pressure fed into a vaporization chamber of the vaporization supply device and heated by a heater. The vaporized material gas is supplied to a process chamber at a flow rate controlled by the pressure type flow rate control device provided downstream of the vaporization chamber.

PRIOR-ART DOCUMENTS

Patent Literatures

Patent Literature 1: Japanese Patent No. 3546153
Patent Literature 2: International Publication No. 2020/075600
Patent Literature 3: International Publication No. 2019/021948
Patent Literature 4: Japanese Patent No. 3494594

SUMMARY OF INVENTION

Technical Problem

In the case of using the above vaporization supply device, a gas having a high temperature that is 200° C. or higher may be supplied to the pressure type flow rate control device. In addition, in a state of closing a stop valve downstream of the pressure type flow rate control device for a certain or more hours, a high pressure gas of about 200 kPa abs (absolute pressure) is sometimes given to the pressure sensor as a load.

The present inventors have found that, especially under usage environment of high temperatures and high pressures as described above, in the flow path where the pressure type flow rate control device is connected, when performing evacuation with opening the stop valve from a gas pressurized sealed state, a phenomenon that an output of the pressure sensor (absolute pressure) drops to a negative value beyond zero (hereinafter sometimes referred to as zero point deviation or zero point drop) occurs. Then, after the pressure sensor shows the output below zero in this manner, it was confirmed that a considerable time, for example, several hours may be taken in order to recover the output of the pressure sensor from negative to zero, even in a state of continued evacuation.

The occurrence of such a zero point drop is detrimental to the reliability of the output of the pressure sensor, and when a zero point drop occurs, it may be necessary to interrupt the subsequent process and cope with it. Therefore, it is required to provide a diaphragm type pressure sensor that can be used even in a high temperature environment, and zero point drop hardly occurs even at the time of evacuation after pressurized sealing.

The present invention has been made to solve the above problem, and its main objective is to provide a pressure sensor that zero point drop (output below zero) can be suppressed when used in a high temperature environment.

Solution to Problem

The pressure sensor according to an embodiment of the present invention comprises a sensor module including a diaphragm in contact with a pressure receiving chamber wherein the sensor module is fixed to a body formed with a flow path therein and is a bottomed cylindrical sensor module having inside a pressure receiving chamber communicating with the flow path; a pressure detecting element fixed to the diaphragm for outputting a strain of the diaphragm as a pressure; a base ring fixed at an outer edge of an end portion of an opening side of the sensor module and arranged on an outer peripheral side of the sensor module; a hermetic member fixed to the base ring for forming a sealed vacuum chamber opposite to the pressure receiving chamber across the diaphragm; a gasket sandwiched between the base ring and the body; and a pressing flange for pressing the base ring to the body through a gasket.

In one embodiment, the diaphragm is formed from a cobalt-nickel alloy.

In one embodiment, the diaphragm is formed from a cobalt-nickel alloy that is heat-treated at a temperature of 500° C. or higher for 100 minutes or more.

In one embodiment, a groove is formed in the base ring to relax the stress transmitted to the diaphragm when fixing to the body using the pressing flange.

In one embodiment, the groove is formed along a circumferential direction on an end face of the base ring on a side where the hermetic member is fixed.

In one embodiment, the groove is formed along a circumferential direction on an inner peripheral surface of the base ring facing the sensor module.

In one embodiment, the pressure sensor further comprises a cylindrical outer peripheral wall being fixed to the outer peripheral portion of the base ring and having the same diameter as the base ring, a gap is opened inside of the outer peripheral wall, and the hermetic member is arranged therein.

In one embodiment, the hermetic member includes a hermetic ring fixed to the base ring, and a lid arranged so as to cover the diaphragm with a gap therebetween and seal the hermetic ring.

In one embodiment, when evacuating the flow path and the pressure receiving chamber after sealing the fluid in the flow path and the pressure receiving chamber, under the conditions where the temperature of the sealed fluid is 210° C., the sealing period is 120 minutes, and the sealing pressure is 200 kPa abs., the pressure below zero output by the pressure detecting element during the evacuation is less than 0.25% of the sealing pressure.

In one embodiment, the tightening torque of the pressing flange to the body is no more than 50 N m.

Effect of Invention

In the pressure sensor according to the embodiment of the present invention, the zero point drop generated during the evacuation after pressure sealing in a high-temperature environment is reduced.

DESCRIPTION OF EMBODIMENTS

Embodiments of the present invention will be described below with reference to the drawings, but the present invention is not limited to the following embodiments.

Figure 1:
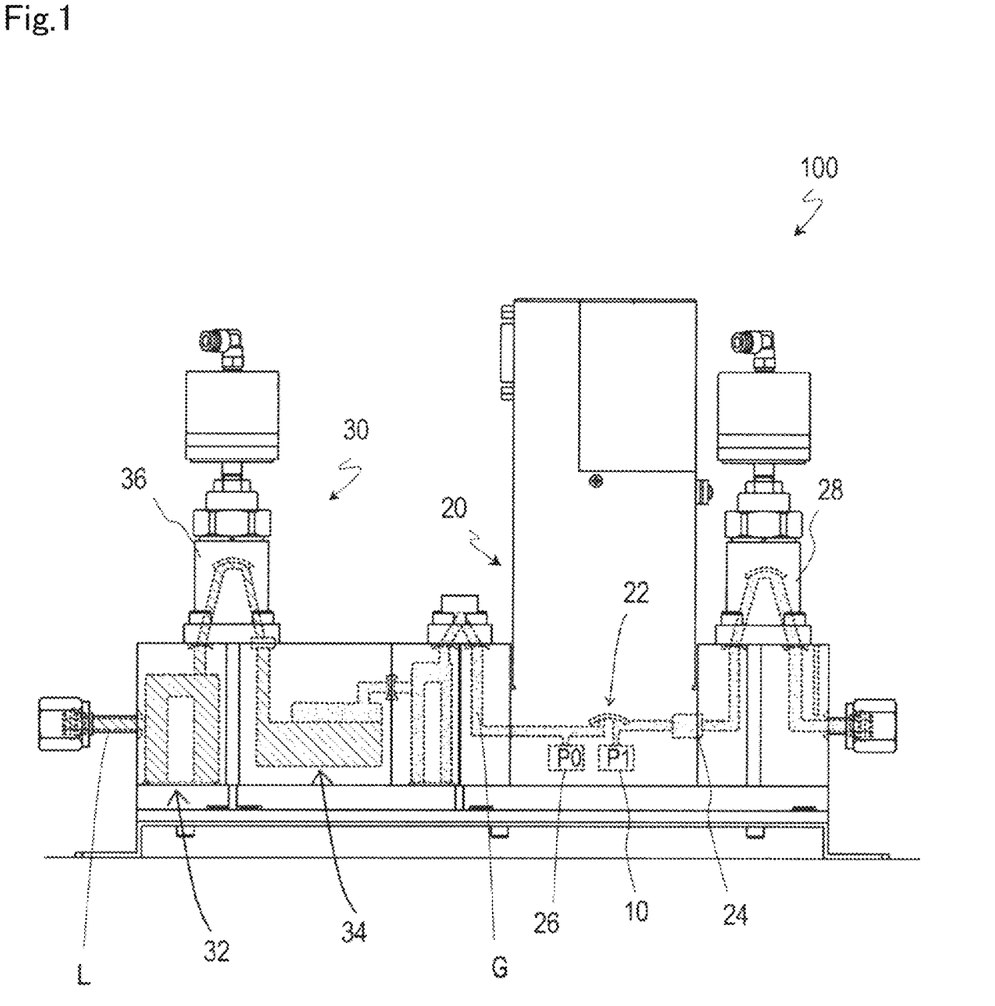
FIG. 1 is a diagram showing a gas supply system using a pressure sensor according to an embodiment of the present invention.
Figure 2:
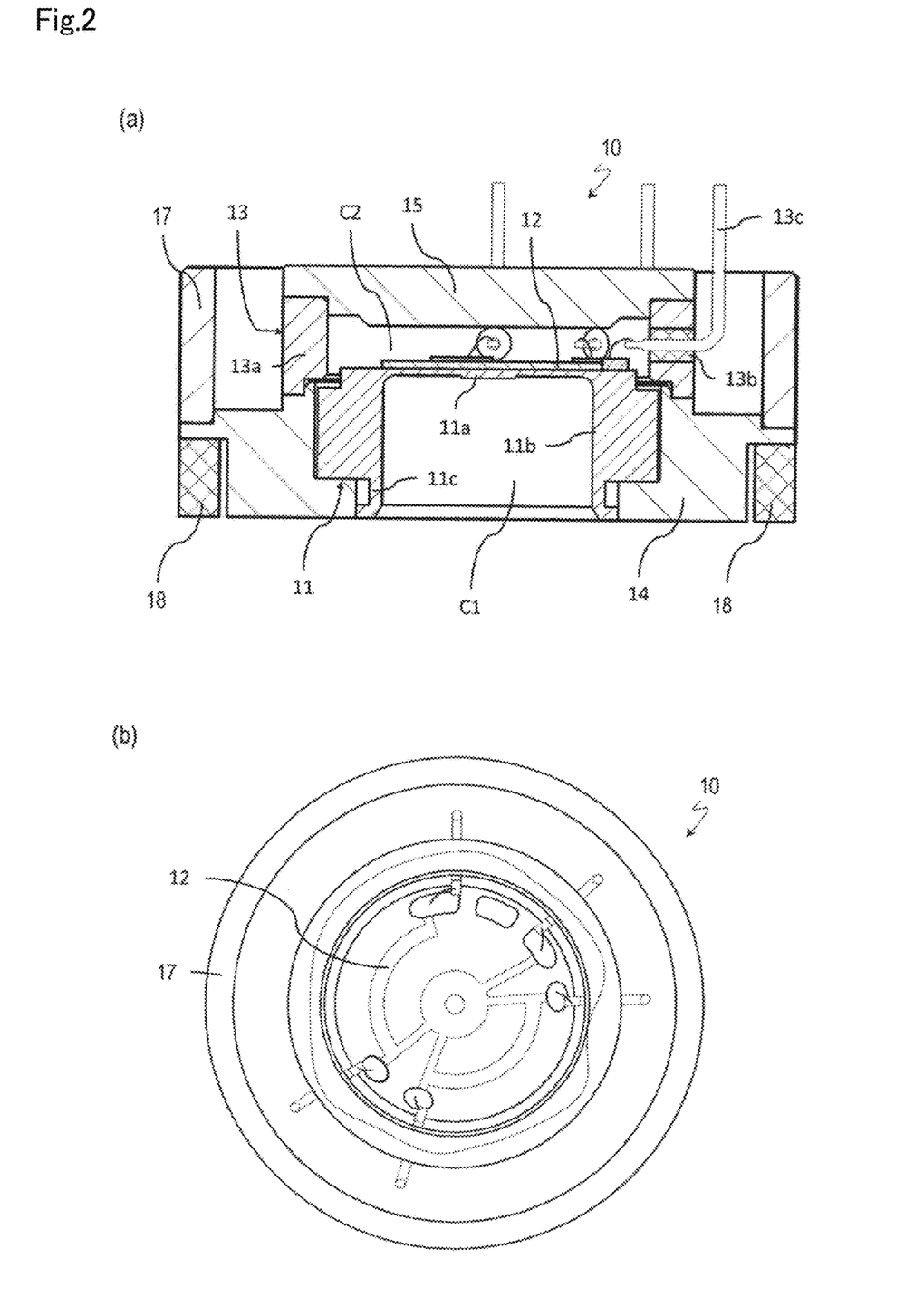
FIG. 2 is a diagram showing a pressure sensor according to an embodiment of the present invention, where (a) is a sectional view, (b) is a transmission view when viewed from an upper surface.

FIG. 1 illustrates a high temperature gas supply system 100 including a pressure type flow rate control device 20 with a pressure sensor 10 according to an embodiment of the invention and a vaporization supply device 30 provided upstream thereof. FIGS. 2(a) and 2(b) show a pressure sensor 10 according to the present embodiment.

As shown in FIG. 1, the pressure sensor 10 is provided in a flow path between a control valve 22 and a restriction part 24 of the pressure type flow rate control device 20, and is used to detect an upstream pressure of the restriction part 24 (hereinafter, sometimes referred to as the upstream pressure P1 or controlled pressure). An output of the pressure sensor 10 is used to feedback control the control valve 22, and by controlling the upstream pressure P1 using the control valve 22, the flow rate of the fluid flowing downstream of the restriction part 24 may be controlled. Further, as the downstream side of the restriction part 24 is provided with a stop valve 28, it is possible to stop the supply of gas more reliably by closing the stop valve 28.

As the control valve 22, various valves that are adjustable to an arbitrary opening degree (proportional valve) are used, for example, a piezo valve configured to adjust the opening degree of a diaphragm valve by a piezo actuator is preferably used. As the stop valve 28, an air operated valve (AOV) or an on-off valve such as a solenoid valve having excellent responsivity and shut-off property is preferably used. As the restriction part 24, an orifice plate or a critical nozzle is preferably used. The diameter of the orifice or the nozzle is set, for example, from 10 µm to 2000 µm.

In the high temperature gas supply system 100, the vaporization supply device 30 receives a liquid raw material L. and the liquid raw material L is vaporized and delivered to the pressure type flow rate control device 20 as a gas G. The vaporizing supply device 30 includes a preheating section 32 for preheating the liquid raw material L and a vaporization section 34 connected to the preheating unit 32 through a liquid raw material supply valve 36. By opening and closing the liquid raw material supply valve 36, it is possible to control the supply amount of the liquid raw material L to the vaporization unit 34.

The preheating section 32 of the vaporization supply device 30 is heated to, for example, 180° C. by a heater. The vaporization section 34 is heated to, for example, 200° C. Furthermore, in order to prevent reliquefaction of the delivered gas, the pressure type flow rate control device 20 is heated to, for example, 210° C. or higher. Therefore, as the pressure sensor 10 will also be heated to a high temperature of 200° C. or higher, it is required to detect the pressure accurately even in such a high-temperature environment. In the present embodiment, the stop valve 28 is also heated by a heater, the outlet side of the stop valve 28 is heated to, for example, 220° C. The set temperature of the heater is arbitrarily selected depending on the material to be vaporized.

In the present embodiment, an inflow pressure sensor 26 for measuring a supplied pressure P0 is also provided upstream of the control valve 22. An output of the inflow pressure sensor 26 may be used for controlling the amount of gas generated in the vaporizing unit 34. The inflow pressure sensor 26 may also have the same configuration as the pressure sensor 10 described below.

As shown in FIGS. 2(a) and 2(b), the pressure sensor 10 of the present embodiment has a diaphragm 1 1a whose one surface contacts with a pressure receiving chamber C1. And a pressure detecting element 12 including a strain gage is fixed to the other surface opposite to the pressure receiving chamber C1. In addition, a vacuum chamber C2 is provided so as to be in contact with the surface opposite to the pressure receiving chamber C1 (or the surface provided with the pressure detecting element 12). The pressure sensor 10 is configured to output zero as the absolute pressure when no stress is generated in the diaphragm 11a, that is, when the pressures of the pressure receiving chamber C1 and the vacuum chamber C2 are the same.

Figure 3:
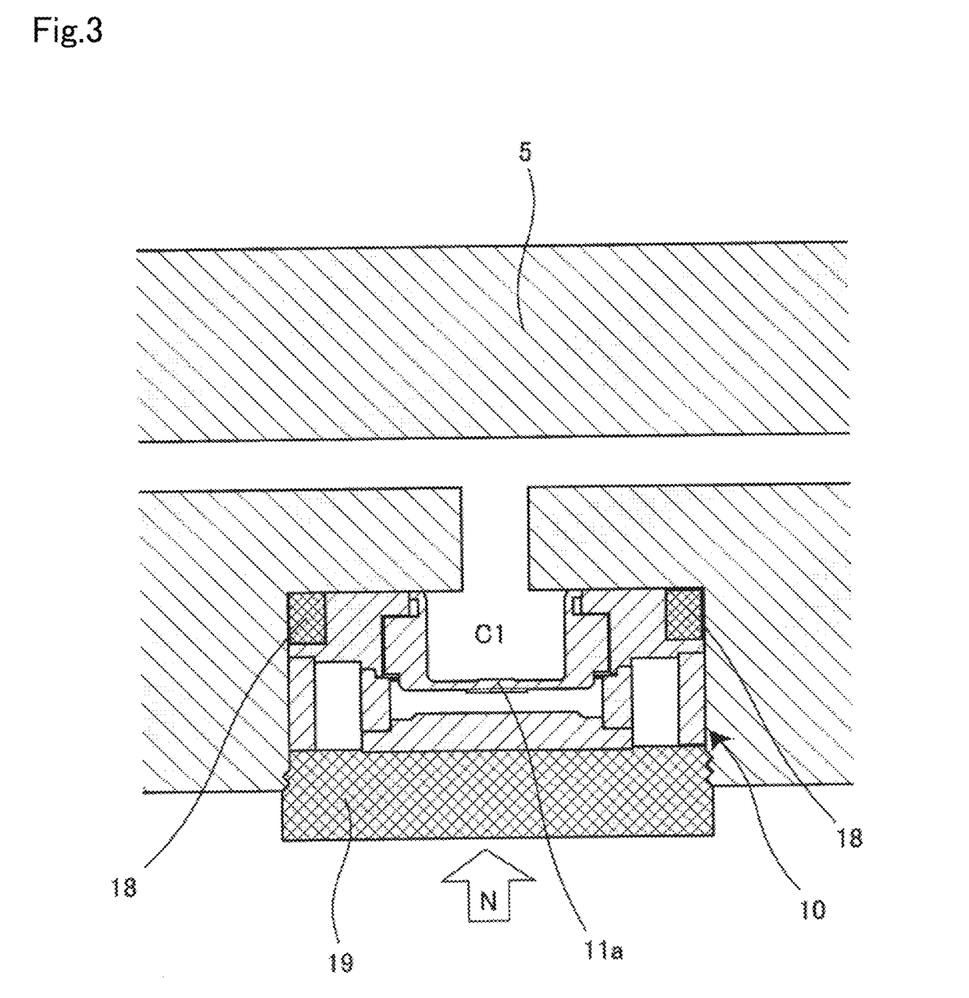
FIG. 3 is a sectional view showing an embodiment of mounting the pressure sensor to a body.

FIG. 3 shows a mounting example of the pressure sensor 10. The pressure sensor 10, in a direction opposite to the direction shown in FIG. 2(a), is accommodated and fixed in an accommodating recess provided on a lower surface of a body 5 formed with a flow path therein. The body 5 is a metal block (e.g., a block made of SUS316L) in which the flow path of the pressure type flow rate control device 20 shown in FIG. 1 is formed. A piezo valve or the like is attached on an upper surface of the body 5.

The bottom central portion of the accommodating recess is provided with a communication path for communicating the flow path formed in the body 5 and the pressure receiving chamber C1 of the pressure sensor 10, the pressure sensor 10 can measure the pressure of the fluid flowing through the flow path of the body 5. In addition, different from this example, as long as it communicates with the flow path, the pressure sensor 10 may be attached to another location, such as the upper surface of the body 5 (the side where the piezo valve is fixed).

The pressure sensor 10 is fixed so as to be pressed against the bottom surface of the accommodating recess of the body 5 while maintaining the sealing property by the gasket 18. The fixing of the pressure sensor 10 is performed by tightening a pressing flange 19 (e.g., made of SUS316L) from outside. At this time, by adjusting the magnitude of the tightening torque N of the pressing flange 19, the fixing degree of the pressure sensor 10 changes. In the present embodiment, fixing is performed by a relatively small torque (e.g., 50 N·m or less) in order to reduce the stress applied to the pressure sensor 10 in particular to the diaphragm 11a when fixing. The change in the sensor output in accordance with the tightening torque N will be described later.

Referring again to FIGS. 2(a) and 2(b), the detailed configuration of the pressure sensor 10 will be described. As described above, the pressure sensor 10 has a diaphragm 11a that is in contact with the fluid flowing into the pressure receiving chamber C1 and distorts in accordance with the pressure of the fluid. The diaphragm 11a is provided as the bottom of a sensor module 11 formed in a bottomed cylindrical shape.

In addition, the sensor module 11 is supported by a base ring 14 fitted and fixed thereto. Further, a hermetic member 13 (including a hermetic ring 13a and a lid 15) is fixed on an upper end surface of the base ring 14. The hermetic member 13 (more specifically the hermetic ring 13a) and the base ring 14 are hermetically connected by welding an annular step portion fitted thereto, and the sensor module 11 is accommodated in the inner space.

In the present embodiment, the hermetic member 13 is formed in a bottomed cylindrical shape by welding the cylindrical hermetic ring 13a and the lid 15. The hermetic member 13 is provided above the diaphragm 11a of the sensor module 11. More particularly, the hermetic ring 13a is fixedly provided to the base ring 14 as an outer peripheral wall of the diaphragm 11a, and the lid 15 is provided so as to cover the diaphragm 11a with a gap in between and seal the opening of the hermetic ring 13a. In this configuration, a hermetically sealed vacuum chamber (sealed vacuum chamber) C2 in contact with the diaphragm 11a is formed by sealing after evacuating the inside of the hermetic member 13. The vacuum chamber C2 is a space opposite to the pressure receiving chamber C1 sandwiching the diaphragm 11a therebetween.

In addition, the distal end portions of a plurality of lead wires 13c are hermetically inserted in the hermetic ring 13a through a low melting point glassy material 13b, each distal end portion of the lead wires 13c is connected to the strain gage of the pressure detecting element 12 through a bonding wire. The bonding wire is usually formed of gold, but aluminum, copper or the like may be used instead of gold. The bonding wire is designed to have 10-50 μm in diameter. The strain gage is usually constituted by a resistance wire of a metallic foil, and the magnitude of the strain occurred in the diaphragm 11a can be detected by detecting the change of the electric resistance of the resistive wire by a bridge circuit through the lead wires 13c.

Further, in the present embodiment, the base ring 14 has a housing recess provided with an inner peripheral surface facing an outer peripheral surface of the cylindrical portion 11b of the sensor module 11. In addition, an open-side end 11c of the sensor module 11 is formed in a smaller diameter than the cylindrical portion 11b and has a flange, and the housing recess of the base ring 14 is also formed in a form that fits the open side end 11c of the sensor module 11. The base ring 14 is welded to an outer edge of the open side end 11c of the sensor module 11, and the base ring 14 and the sensor module 11 are firmly fixed from each other.

An annular notch for arranging a ring-shaped gasket 18 is formed on a lower side of an outer peripheral portion of the base ring 14 (the side facing the bottom surface of the housing recess of the body 5). Thus, as shown in FIG. 3, when the pressure sensor 10 is attached to the body 5, fixing is performed through the gasket 18, and sealing between the flow path and the outside is improved. The gasket 18 may be formed from a metal such as austenitic stainless steel but may also be formed from a more flexible material such as an O-ring to suppress zero point drop, which will be described later. The gasket 18 is deformed in accordance with tightening of the pressing flange 19 to improve the sealing property.

In the above configuration, the gasket 18 is sandwiched between the base ring 14 and the body 5, while the sensor module 11 is fixed in a manner accommodated in the base ring 14 but not in directly. In such an embodiment, when mounting the pressure sensor 10 in the recess of the body 5 by using the pressing flange 19, the stress from the base ring 14 to the sensor module 11 is less likely to be applied. Therefore, in the post installation, the residual stress in the diaphragm 11a of the sensor module 11 is small, thereby suppressing the zero point drop of the pressure sensor 10, which is especially likely to occur at high temperature and high pressure.

In addition, in the present embodiment, a cylindrical outer peripheral wall 17 having the same diameter as the base ring 14 is fixed on the upper side of the outer peripheral portion of the base ring 14. In this configuration, the hermetic member 13 is disposed on the inner side of the outer peripheral wall 17 with a gap in between.

By providing the outer peripheral wall 17, the pressure sensor 10 may be easily fixed in the housing recess of the body 5 airtightly without jouncing. Further, since the pressure sensor 10 is fixed by the pressing flange 19 through the outer peripheral wall 17, which is in contact with the pressing flange 19, stress is hardly generated in the diaphragm 11a even when tightening the pressing flange 19. However, if sufficient airtightness and fixation can be ensured, the outer peripheral wall 17 is not necessarily required. Further, instead of providing the outer peripheral wall 17 to the base ring 14, it may be configured so as to provide a similar outer peripheral wall to the pressing flange 19 to press the peripheral edge portion of the base ring 14.

Here, in the present embodiment, the base ring 14 is formed by Hastelloy C-22 (Hastelloy is a registered trademark), which is one of the nickel-molybdenum-chromium alloys having excellent corrosion resistance. Since the base ring 14 is not required to deform such as the diaphragm 11a is required, it may be formed from a stainless steel (e.g., SUS316L or the like) instead of Hastelloy C-22. Further, the hermetic ring 13a and the outer peripheral wall 17 are formed from austenitic stainless steel having excellent corrosion resistance such as SUS316L or SUS304.

On the other hand, unlike the base member (hermetic ring 13a and base ring 14), the sensor module 11 including the diaphragm 11a is formed from Spron 510 (Spron is a registered trademark), which is a nickel-cobalt alloy. This is because the material of the diaphragm 11a greatly affects the zero point drop of the pressure sensor 10. Thus, by appropriately selecting the material for each component member, the pressure sensor 10 is suitable for use at high temperature and high pressure, while ensuring the sealing property. The thickness of the diaphragm 11a is designed to, for example, 50 μm to 200 μm.

Further measures against the zero point drop phenomenon of the pressure sensor 10 will be described below.

Figure 4:
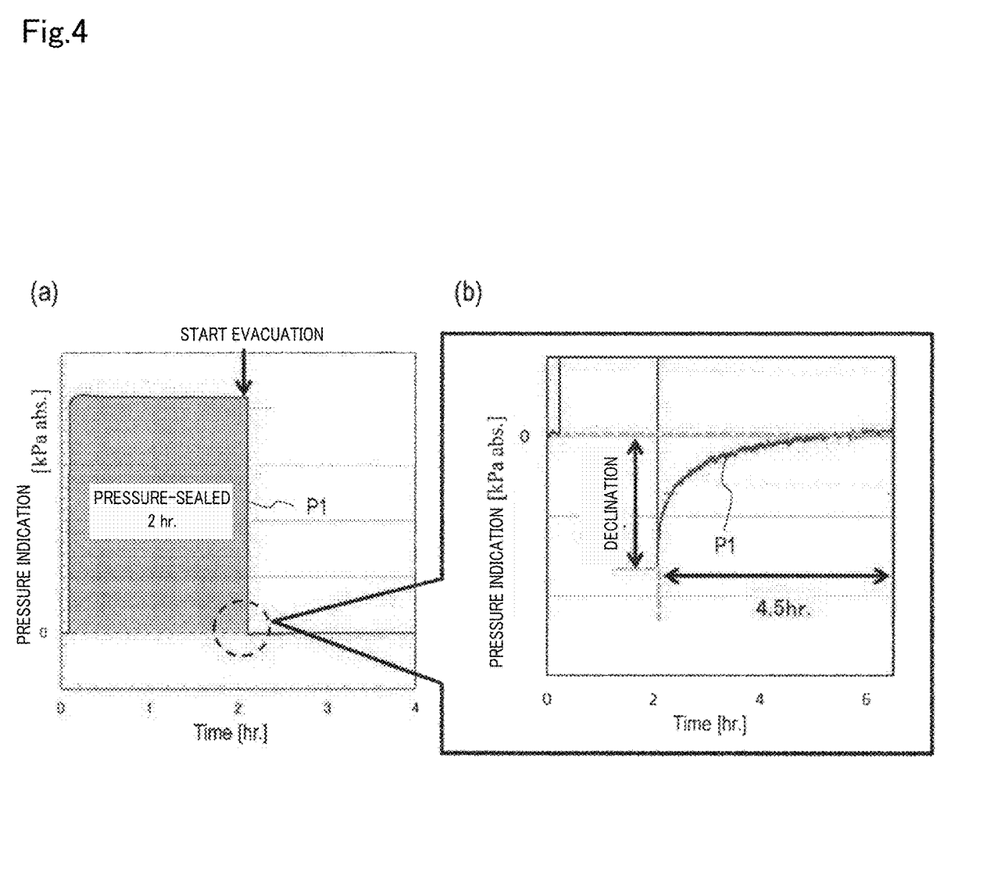
FIG. 4 is a diagram showing a zero point drop of the pressure sensor during evacuation after pressured sealing, (a) shows an entire process, (b) is an enlarged view compressed in a time axis direction.

As shown in FIG. 4(a), in some cases, the pressure sensor 10 may be given a pressure that is about 200 kPa abs (absolute pressure) or more for a relatively long period of time such as 2 hours as a load. This occurs in a situation, for example, as a pre-stage of the gas supply, where the downstream stop valve 28 is closed and the gas supply is stopped.

When the gas supply is stopped, the control valve 22 is normally also closed, but leakage may occur from the seat of the valve, and the pressure downstream of the control valve 22 (i.e., the upstream pressure P1) may also be at a higher pressure as same as the gas pressure (i.e., the supply pressure P0) of the vaporization supply device 30. Therefore, when sealing the gas in the flow path between the vaporization supplying device 30 and the stop valve 28 for a long time, the upstream pressure P1 measured by the pressure sensor 10 is also maintained at a higher pressure over a long period of time.

Then, if such a pressure sealed state maintained at a high pressure and a high temperature continues for a long time, thereafter, as shown in FIG. 4(b), which is enlarged with compressing the time-axis, when starting the vacuum evacuation in the flow path by opening the stop valve 28, the output (i.e., the upstream pressure P1) of the pressure sensor 10 may show a negative value below zero. The output of the pressure sensor 10 will recover from the negative value to zero over time, however, it may take several hours or more for recovery (for example here 4.5 hours).

The reason why such a zero point drop phenomenon occurs is considered to be that when the stresses given to the diaphragm 11a change abruptly and drastically, a creep phenomenon (temporal change of strain produced in the material) responding to the material of the diaphragm 11a occurs. The creep phenomenon is generally known to be more significant at a higher temperature.

More specifically, since the strain gage is an element for detecting the stress generated in the diaphragm as a change in the electric resistivity, the output will change with respect to time even when the flow path is maintained at a vacuum pressure due to creeping generated in the diaphragm 11a. Therefore, it is considered that a value below zero have been output as pressure for a relatively long time, especially in a high temperature environment until the strain is eliminated. As the reason why the output at the beginning of evacuation drops below zero, it is considered that the electric resistance value of the strain gauge becomes smaller than the reference value associated with the absolute pressure zero, due to the unintentional stress (for example, stress acting in the direction to compress the strain gauge) generated in the diaphragm 11a when the pressure fluctuates.

Figure 5:
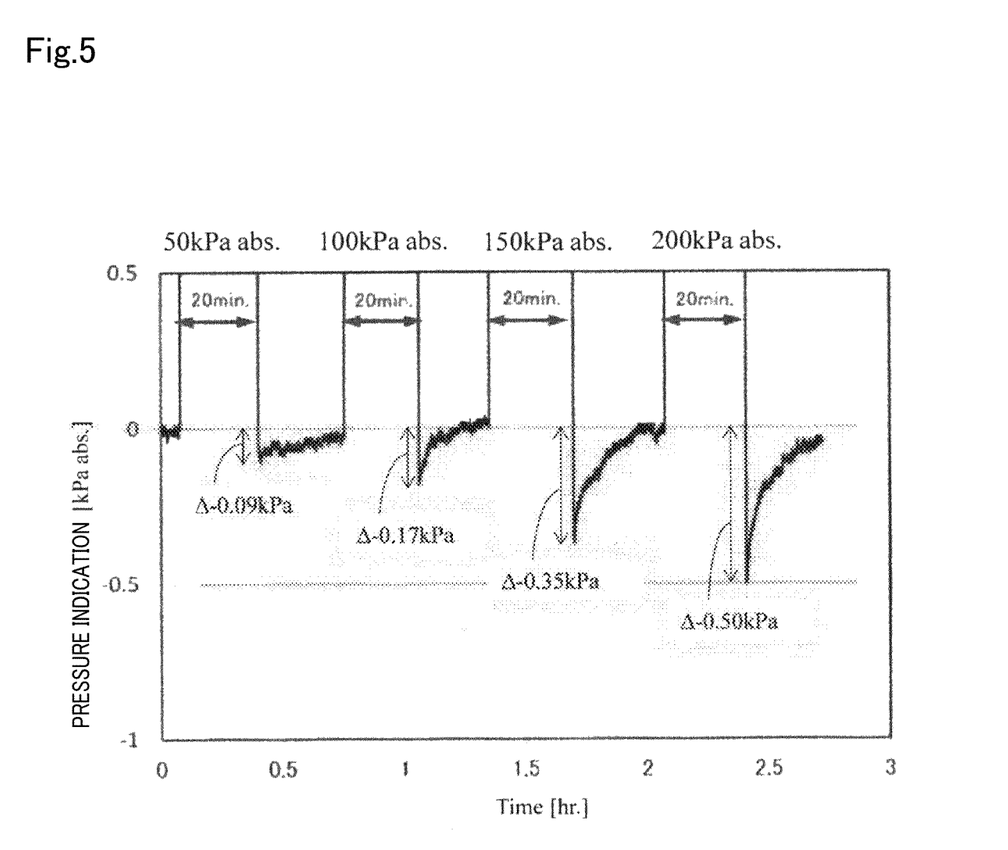
FIG. 5 is a diagram showing the variation of the zero point drop responding to sealing pressures.

FIG. 5 is a graph showing the zero point drop varies corresponding to the pressure at the time of pressure sealing (hereinafter, sometimes referred to as sealing pressure). As can be seen from FIG. 5, even the sealing time is the same (here 20 minutes), the zero point drop is larger at the sealing pressure of 100 kPa than that at the sealing pressure of 50 kPa, and the zero point drop at 150 kPa is larger than that at 100 kPa, the zero point drop is larger at 200 kPa than that at 150 kPa. Thus, it is observed that the higher the pressure at the time of sealing, the larger the zero point drop at the dropping time, also the time required for recovery becomes longer.

Figure 6:
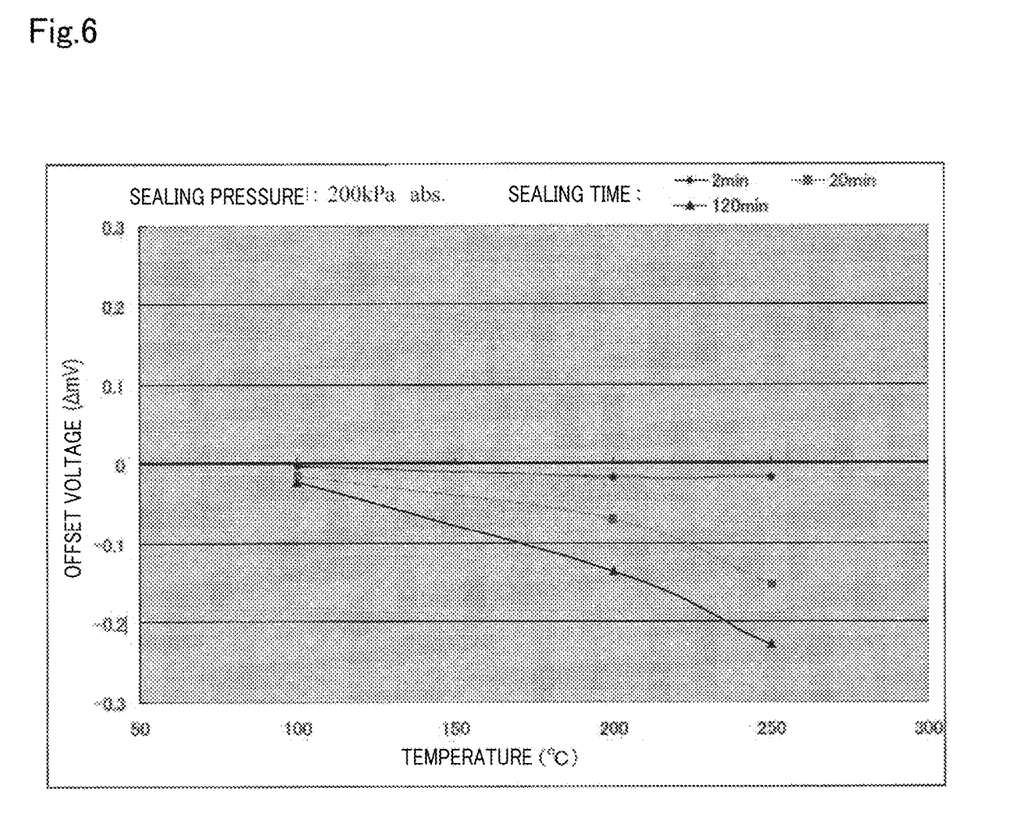
FIG. 6 is a diagram showing the variation of the zero point drop (offset voltage fluctuation) caused responding to ambient temperatures.

Further, FIG. 6 is a graph showing the relationship between the ambient temperature and the offset voltage fluctuation (corresponding to the zero point drop), indicating the amount of the offset voltage fluctuation immediately after the start of evacuation in each case of the pressure sealing time of 2 minutes, 20 minutes, and 120 minutes. In all cases, the sealing pressures are unified by 200 kPa abs. The amount of the offset voltage fluctuation is the output value shown by the pressure sensor, which is calibrated to output zero when the absolute pressure is zero (i.e., when no distortion in the strain gauge), immediately after the start of evacuation, more specifically, the value (average value) of the voltage signal output by the Wheatstone bridge circuit connected to the strain gauge.

As can be seen from FIG. 6, the longer the pressure and sealing time before evacuation, also, the higher the ambient temperature, the larger the amount of the offset voltage fluctuation (i.e., the zero point drop) tends to be. For example, when the pressure sealing time is 20 minutes or more and the ambient temperature is 200° C. or higher, the amount of the offset voltage fluctuation is relatively large, when the pressure sealing time is 20 minutes or more and the ambient temperature is 250° C., or when the pressure sealing time is 120 minutes and the ambient temperature is 200° C. or higher, the amount of the offset voltage fluctuation becomes considerably larger.

Thus, it can be seen that the zero point drop increases, especially after the diaphragm 11a is exposed to high temperature and high load for a long time. Then, since the zero point drop phenomenon is caused by the creep phenomenon generated in the diaphragm 11a, the control of the mechanical properties of the diaphragm 1a is considered to be crucial for suppressing the creep and thus the zero point drop.

Based on the above findings, the inventors of the present application selected materials capable of suppressing the zero point drop for the diaphragm 11a. As a result, it has been discovered that it is preferable to form the diaphragm 11a from Spron rather than conventional Hastelloy, in addition to using the pressure sensor 10 having the configuration shown in FIG. 2. Then, in particular, it has been discovered that the zero point drop can be suppressed more effectively by properly heat treating the diaphragm 11a made of Spron.

Figure 7:
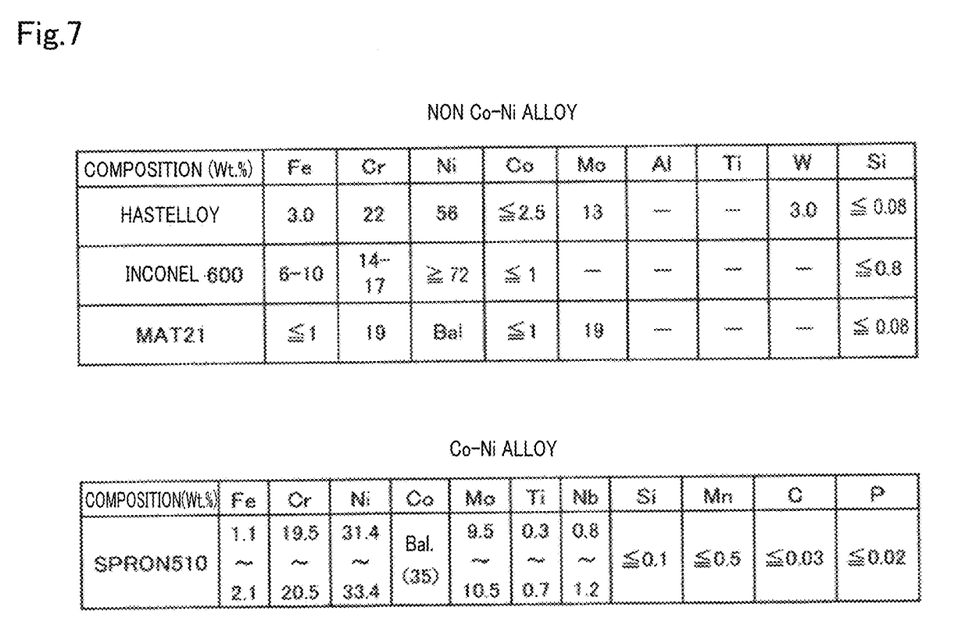
FIG. 7 is tables showing a composition (by weight ratio) of each material which forms a diaphragm.

FIG. 7 shows the composition (by weight %) of four types of metals that may be used for the diaphragm 11a. As shown in FIG. 7, Hastelloy, which has been often used conventionally, is a nickel-molybdenum-chromium alloy containing Ni by 50 wt % or more, while the content of Co is small, and containing Mo and Cr by 13 wt % and 22 wt %, respectively.

Furthermore, Inconel 600 (Inconel is a registered trademark) is a nickel-chromium-iron alloy mainly composed of nickel and contains chromium and iron. In addition, MAT21 is a nickel-molybdenum-chromium alloy similar to Hastelloy and contains about 1.8 wt % of Ta not shown in the table.

On the other hand, the Spron 510, which is a material of the diaphragm 11a in the present embodiment, is a cobalt-nickel alloy (or cobalt-nickel-chromium-molybdenum alloy).

In the present specification, the cobalt-nickel alloy means an alloy containing 50 wt % or more of sum of Co and Ni, and 20 wt % or more of Co and Ni respectively. Also, in the present specification, the cobalt-nickel alloy typically refers to those in which the content of Co is greater than the content of Cr and the content of Mo. In the above examples, Hastelloy, Inconel 600, and MAT21 are non-cobalt-nickel alloys, only Spron 510 is a cobalt-nickel alloy.

Spron 510 is a cobalt-nickel alloy used in the present embodiment. It is considered to have mechanical properties less likely to deform than Hastelloy, Inconel 600, and MAT21. It has been confirmed that the 0.2% proof stress of Spron 510 after heat treatment described below is remarkably large at 1050 MPa, while 0.2% proof stress of Hastelloy at room temperature is 343 MPa, Inconel is 347 MPa, and MAT21 is 355 MPa.

Therefore, by forming the diaphragm 11a from a cobalt-nickel alloy that is less likely to deform (or has a wider stress range to elastically deform) and less likely to cause strain against stress even at a high temperature, it can be expected to suppress the zero point drop.

Figure 8:
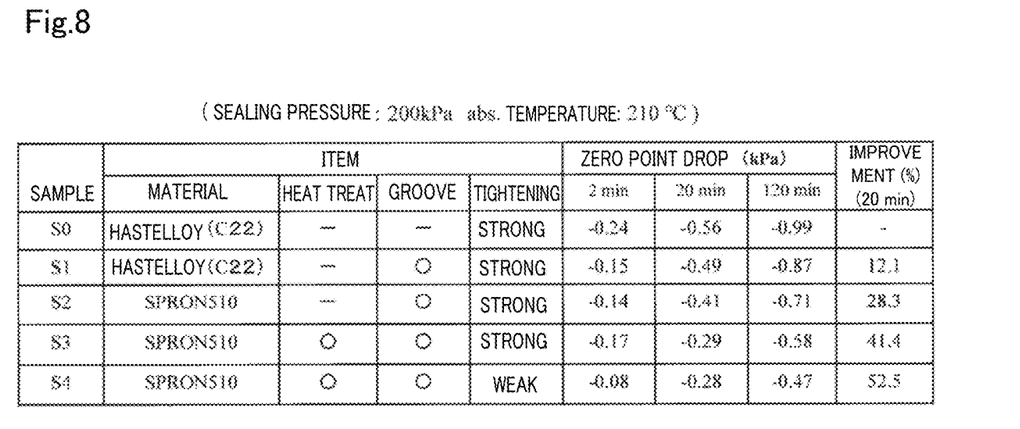
FIG. 8 is a table showing a difference in the zero point drop due to the material of the diaphragm or the presence or absence of the grooves.

FIG. 8 is a diagram showing the difference between the zero point drops (kPa) when the diaphragm 11a is formed from Hastelloy (non-nickel-cobalt alloy) (sample S0, S1) and when it is formed from Spron 510 (nickel-cobalt alloy) (sample S2, S3, S4). The results shown in FIG. 8 are obtained from the output of the pressure sensor 10 when starting the vacuum evacuation by opening the stop valve 28 from the pressure sealed state, when a pressure sensor 10 is incorporated in the high temperature gas supply system 100 shown in FIG. 1.

As the zero point drop, the measurement results when the pressure sealing time before evacuation was in each case of 2 minutes, 20 minutes, and 120 minutes are shown. In any of the cases, the sealing pressure is the same of 200 kPa abs, the set temperature (ambient temperature) is the same of 210° C.

Further, in FIG. 8, changes in the zero point drop (kPa), in response to the presence or absence of heat treatment of the diaphragm 11a (with is O, without is —), the presence or absence of grooving to be described later (with is O, without is —), and the difference in the sensor tightening torque by the pressing flange 19 (strong or weak), are also described.

In addition, the improvement (%) shown in the table indicates the suppression rate of the zero point drop at the samples S1-S4, with respect to the sample S0 (reference embodiment), at the time of the sealing time of 20 minutes (drop difference/S0 drop). Note that since the zero point drops listed in the table are rounded to two decimal places, the improvement rates that can be calculated from the zero point drops listed in the table are somewhat different from the values (%) shown as the improvement.

When comparing the sample S1 with the sample S2, in which materials are different from the Hastelloy C-22 and the Spron 510, under the same conditions, it can be seen that the zero point drop rate is improved when the Spron 510 is used (sample S2). In other words, it can be seen that by forming the diaphragm 11a from a cobalt-nickel alloy, the zero point drop can be suppressed in the high temperature and high pressure environment.

Further, as shown in the sample S2 and sample S3 of FIG. 8, even when the same Spron 510 are used, when comparing the case of heat treatment with the case of no heat treatment when the sealing time is 20 minutes or more, it can be seen that the zero point drop is improved by performing heat treatment.

Here, the heat treatment was performed under vacuum, by heating at a temperature of 525° C. for 2 hours, then, slowly cooling, and subjecting aging treatment. It was confirmed that the hardness Hv was improved by 20% or less compared with that prior to the heat treatment. Further, the tensile strength was about 2400 MPa prior to the heat treatment but was pulled to 2800 MPa after the heat treatment. Further, the 0.2% proof stress after the heat treatment becomes 1050 MPa as described above, and becomes a material hardly deforms as compared with the conventional material.

The above heat treatment is suitably performed at a temperature of 500° C. or higher for 100 minutes or more. By using such a diaphragm 11a formed from a cobalt-nickel alloy with heat-treatment, compared with that without heat treatment, a significantly improved effect of the zero point drop suppressing can be obtained.

Further, as can be seen by comparing sample S3 and sample S4 in FIG. 8, the zero point drop is effectively improved by relatively wakening the tightening torque N of the pressing flange 19, such as 50 N·m or less. This is probably because, when the pressing flange 19 is excessively tightened, excessive stress is applied to the diaphragm 11a, and the strain generated in the diaphragm 11a increases.

Therefore, in order to increase the sealing property of the pressure sensor 10, it is better to increase the tightening torque N, however, while ensuring the sealing property by using the gasket 18, in order to suppress the zero point drop, it is preferable to fix the pressure sensor 10 to the body 5 with a tightening torque N as small as possible that is less than 50 N·m. However, if the tightening torque N is too small, the fixing condition and sealing of the sensor will be hindered, so the tightening torque N is preferred to be 20 N·m or more.

Furthermore, in the pressure sensors of the samples S1-S4 other than that of the sample S0 shown in FIG. 8, a grooving is applied to the base ring 14 for holding the sensor module 11. The grooving is provided as a stress transmission relaxation groove for relaxing the stress transmitted to the diaphragm 11a when mounting the pressure sensor 10 using the pressing flange 19. As can be seen by comparing the sample S0 with the sample S1, by only applying a groove has resulted in further improved zero point drops.

Figure 9:
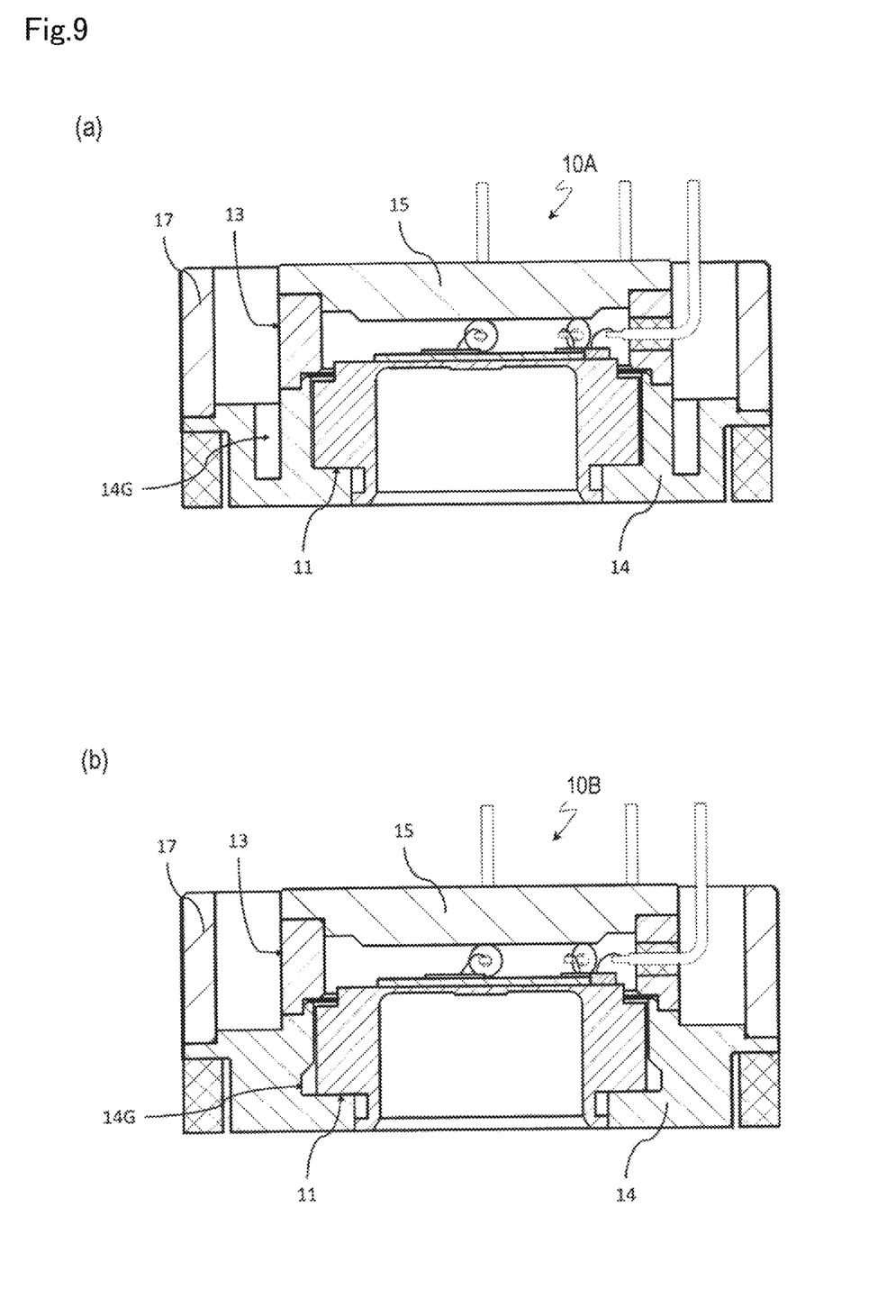
FIG. 9 is a sectional view showing a pressure sensor of a modification provided with a groove for relaxing a stress generated in the diaphragm when mounting to the body. (a) and (b) shows different embodiments.

FIGS. 9(*a*) and 9(*b*) shows pressure sensors 10A, 10B of modifications in which the above described grooving is applied. In the pressure sensors 10A, 10B shown in FIGS. 9(*a*) and 9(*b*), the stress transmission relaxation groove 14G is formed in the base ring 14 of each embodiment respectively.

In the pressure sensor 10A shown in FIG. 9(*a*), on the surface opposite to the gasket mounting surface on the base ring 14, i.e., the surface of the side pressed by the pressing flange 19, or the end face of the side to which the hermetic member 13 is fixed, an annular stress transmission relaxation groove 14G is formed concentric to the hermetic member 13 and the outer peripheral wall 17.

The stress transmission relaxation groove 14G has an inner side surface continuing to the outer peripheral surface of the hermetic member 13, and is formed as a groove having a depth of about 50-80% of the thickness of the base ring 14. By forming the stress transmission relaxation groove 14G in this manner, the transmission of stress is relaxed, the stress occurs in the diaphragm 11a when tightening the pressing flange 19 is suppressed.

Incidentally, the stress transfer relaxation groove 14G of the above is not necessarily formed continuously around, the groove may be interrupted in part as long as the effectiveness of sufficient stress transfer relaxation can be obtained. Here, either a continuous groove or an intermittent groove is referred to as a groove formed along the circumferential direction.

In addition, in the pressure sensor 10B shown in FIG. 9(b), on the sensor module supporting surface of the base ring 14 (i.e., the inner peripheral surface of the base ring 14 that is opposed to the outer peripheral surface of the sensor module 11), an annular stress transmission relaxation groove 14G having a depth in the radial direction is formed. Also by forming the stress transmission relaxation groove 14G in this manner, the transmission of stress is relaxed, and the stress occurs in the diaphragm 11a when tightening the pressing flange 19 is suppressed.

Patent literature 4 discloses a mounting structure of a pressure sensor provided with a shallow groove in the diaphragm base constituting the diaphragm. However, it should be noted that this pressure sensor is not the same as the one shown in FIGS. 9(a) and 9(b), in which the groove is provided in a base ring different from the diaphragm component member.

As described above, the zero point drop can be effectively suppressed by only providing the stress transmission relaxation groove 14G to the base ring 14. This can be seen by comparing the sample S0 with the sample S1 in FIG. 8. However, as in the sampled S4, the zero point drop improving rate has been significantly increased by forming the diaphragm from a heat treated cobalt-nickel alloy, providing a stress transfer relaxation groove, and further using a smaller torque for mounting the sensor, regardless of the length of the sealing time.

By using the pressure sensor 10 of the various aspects described above, it is possible to stably operate the pressure type flow rate control device 20 even being used in a high temperature environment downstream of the vaporization supply device 30 as shown in FIG. 1. In the pressure sensor 10 according to the embodiments of the present invention, when vacuuming the pressure receiving chamber C1 after sealing the fluid to the flow path and the pressure receiving chamber C1, the pressure output from the detecting element 12 that is below zero (absolute value), may be set as, for example, 0.25% or less of the sealing pressure (e.g., 200 kPa) (e.g., 0.5 kPa or less).

More particularly, under the conditions of 210° C. set temperature (fluid temperature), 120 minutes sealing period, and 200 kPa abs, sealing pressure, as can be seen from the sample S4 of FIG. 8, the zero point drop has been able to be improved to below 0.5 kPa, which is 0.25% or less of the sealing pressure 200 kPa.

In the sample S0, which is the reference, although the zero point drop is suppressed as compared with that of the conventional pressure sensor, at the sealing time of 20 minutes, it was difficult to achieve 0.5 kPa or less, which is 0.25% or less of the sealing pressure (200 kPa abs.). In contrast, from the sample S1 to the sample S4, 0.25% or less of the sealing pressure can be achieved at the sealing time of 20 minutes. In particular, it can be seen that the sealing pressure 0.15% or less (here 0.3 kPa) can be achieved even at the sealing time of 20 minutes, and enough zero point drop suppressing effect can be obtained by using a cobalt-nickel alloy (Spron 510) subjected to heat treatment as a material of the diaphragm 11a, while proving a groove on the base ring 14, as shown in the samples S3 and S4.

INDUSTRIAL APPLICABILITY

The pressure sensor according to the embodiments of the present invention can be suitably utilized for pressure measurement of the supply gas in a semiconductor manufacturing apparatus.

REFERENCE SIGNS LIST

5 Body
10 Pressure Sensor
11 Sensor module
11a Diaphragm
12 Pressure detecting element
13 Hermetic member
13a Hermetic ring
14 Base ring
14G Stress transfer relaxation groove
15 Lid
17 Outer peripheral wall
18 Gasket
19 Pressing flange
20 Pressure type flow rate control device
22 Control valve
24 Restriction part
26 Inflow pressure sensor
28 Stop valve
Vaporization supply device
100 High temperature gas supply system

The invention claimed is:

1. A pressure sensor fixed to a body formed with a flow path, comprising:
   a bottomed cylindrical sensor module having inside a pressure receiving chamber communicating with the flow path and including a diaphragm in contact with the pressure receiving chamber;
   a pressure detecting element fixed to the diaphragm for outputting a strain of the diaphragm as a pressure;
   a base ring disposed on an outer peripheral side of the sensor module and fixed at an outer edge of an open side end portion of the sensor module;
   a hermetic member fixed to the base ring for forming a sealed vacuum chamber opposite to the pressure receiving chamber across the diaphragm;
   a gasket sandwiched between the base ring and the body; and
   a pressing flange for pressing and fixing the base ring to the body through the gasket, the pressing flange being configured to apply a pressing force to the base ring from an outside to the body.

2. The pressure sensor according to claim 1, wherein the diaphragm is formed from a cobalt-nickel alloy.

3. The pressure sensor according to claim 2, wherein a groove is formed on the base ring for relaxing a stress transmitted to the diaphragm when fixing to the body using the pressing flange.

4. The pressure sensor according to claim 2, wherein the diaphragm is formed from a cobalt-nickel alloy subjected to heating treatment at a temperature of 500° C. or higher for 100 minutes or more.

5. The pressure sensor according to claim 4, wherein a groove is formed on the base ring for relaxing a stress transmitted to the diaphragm when fixing to the body using the pressing flange.

6. The pressure sensor according to claim 1, wherein a groove is formed on the base ring for relaxing a stress transmitted to the diaphragm when fixing to the body using the pressing flange.

7. The pressure sensor according to claim 6, wherein the groove is formed along a circumferential direction at an end face of the base ring on a side where the hermetic member is fixed.

8. The pressure sensor according to claim 6, wherein the groove is formed along the circumferential direction in an inner peripheral surface of the base ring facing the sensor module.

9. The pressure sensor according to claim 1, further comprising a cylindrical outer peripheral wall being fixed to an outer peripheral portion of the base ring and having a diameter same as the base ring, wherein the hermetic member is arranged on inner side of the outer peripheral wall with a gap in between.

10. The pressure sensor according to claim 1, wherein the hermetic member comprises a hermetic ring fixed to the base ring and a lid for sealing the hermetic ring, the lid being disposed so as to cover the diaphragm with a gap.

11. The pressure sensor according to claim 1, when vacuuming the flow path and the pressure receiving chamber after sealing a fluid in the flow path and the pressure receiving chamber under the conditions where a temperature of a sealed fluid is 210° C., a sealing period is 120 minutes, and a sealing pressure is 200 kPa abs, a pressure output from the pressure detecting element at the time of evacuation is less than zero but a magnitude of a drop from zero is less than 0.25% of the sealing pressure.

12. The pressure sensor according to claim 1, wherein a tightening torque of the pressing flange to the body is 50 N·m or less.

13. The pressure sensor according to claim 1, wherein the body has a housing recess for accommodating the base ring, the sensor module is accommodated in the base ring, and the pressing flange is configured to press the base ring to a bottom face of the housing recess.

14. The pressure sensor according to claim 13, wherein the gasket is provided between an outer peripheral portion of the base ring and the bottom face of the housing recess.

* * * * *